United States Patent
Barkie et al.

(10) Patent No.: US 9,615,259 B2
(45) Date of Patent: *Apr. 4, 2017

(54) PUSHING SECURE NOTIFICATIONS TO MOBILE COMPUTING DEVICES

(71) Applicant: International Business Machines Corporation, Armonk, NY (US)

(72) Inventors: Eric J. Barkie, Morrisville, NC (US); Benjamin L. Fletcher, Milwaukee, WI (US); Carlos A. Fonseca, LaGrangeville, NY (US); Leslie S. Liu, White Plains, NY (US); Colm V. Malone, Middletown, NY (US); Min Wei, New City, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/881,673

(22) Filed: Oct. 13, 2015

(65) Prior Publication Data

US 2016/0037349 A1    Feb. 4, 2016

Related U.S. Application Data

(63) Continuation of application No. 14/051,779, filed on Oct. 11, 2013, now Pat. No. 9,253,644, which is a
(Continued)

(51) Int. Cl.
*H04M 1/66* (2006.01)
*H04W 12/10* (2009.01)
(Continued)

(52) U.S. Cl.
CPC ............ *H04W 12/10* (2013.01); *H04L 67/20* (2013.01); *H04L 67/26* (2013.01); *H04W 12/02* (2013.01); *H04L 63/0428* (2013.01)

(58) Field of Classification Search
CPC ...... H04W 12/02; H04W 12/10; H04L 67/20; H04L 67/26; H04L 63/0428
(Continued)

(56) References Cited

U.S. PATENT DOCUMENTS 6,654,786 B1    11/2003    Fox et al.
7,299,349 B2    11/2007    Cohen et al.
(Continued)

*Primary Examiner* — Wayne Cai
(74) *Attorney, Agent, or Firm* — Louis J. Percello; Ryan, Mason & Lewis, LLP

(57) ABSTRACT

Techniques are provided for pushing secure notifications to a mobile computing device. For example, a method for pushing secure notifications includes a push service platform receiving a push notification message request from an entity registered with the push service platform, processing the push notification message request to generate a secure push notification message, and sending the secure push notification message to a target mobile computing device through a native third-party push service associated with the target mobile computing device. The secure push notification message includes a message ID (identifier) that corresponds to message content associated with the push notification message request. The method further includes the push service platform receiving a pull message request from the target mobile computing device, the pull message request requesting the message content associated with the push notification message corresponding to the message ID, and sending the requested message content associated with the push notification message to the mobile computing device.

15 Claims, 9 Drawing Sheets

Related U.S. Application Data continuation of application No. 13/248,094, filed on Sep. 29, 2011, now Pat. No. 8,634,810.

(51) Int. Cl.
  *H04L 29/08* (2006.01)
  *H04W 12/02* (2009.01)
  *H04L 29/06* (2006.01)

(58) Field of Classification Search
  USPC .............................. 455/410, 411, 414–414.3
  See application file for complete search history.

(56) References Cited

U.S. PATENT DOCUMENTS

| | | |
|---|---|---|
| 2005/0169285 A1 | 8/2005 | Wills et al. |
| 2008/0313294 A1 | 12/2008 | Malone et al. |
| 2009/0275349 A1 | 11/2009 | Bae et al. |
| 2010/0114718 A1 | 5/2010 | Cho |
| 2010/0227632 A1 | 9/2010 | Bell et al. |
| 2011/0026704 A1 | 2/2011 | Connelly et al. |
| 2011/0040895 A1 | 2/2011 | Griffin et al. |
| 2013/0047034 A1 | 2/2013 | Salomon et al. |

500

| DEVICE REGISTRATION DATA STRUCTURE | |
|---|---|
| USER NAME | Character String |
| DEVICE TYPE | Character String |
| DEVICE INFORMATION | Character String |
| USER PASSWORD | Character String |
| PUBLIC ENCRYPTION KEY | Character String |

| PUSH NOTIFICATION DEVICE DATA STRUCTURE | |
|---|---|
| USER NAME | Character String |
| UIF DEVICE ID | Character String |
| DEVICE TYPE | Character String |
| DEVICE ACTIVE | Boolean |
| REGISTRATION TIME | Integer |
| LAST UPDATE TIME | Integer |
| DEVICE INFORMATION | Character String |
| PUBLIC ENCRYPTION KEY | Character String |

| MESSAGE REGISTRATION DATA STRUCTURE | |
|---|---|
| UIF DEVICE ID | Character String |
| TITLE | Character String |
| CONTENT | Binary |
| CONTENT TYPE | Character String |
| ENCRYPTION MODE | Character String |
| PRIORITY | Integer |

| PUSH NOTIFICATION MESSAGE DATA STRUCTURE | |
|---|---|
| UIF MESSAGE ID | Character String |
| UIF DEVICE ID | Character String |
| TITLE | Character String |
| ENCRYPTED CONTENT | Encrypted Data |
| CREATION TIME | Integer |
| PUSH TIME | Integer |
| CONTENT TYPE | Character String |
| PRIORITY | Integer |

FIG. 8

| SECURE MESSAGE DATA STRUCTURE | |
|---|---|
| TITLE | Character String |
| ENCRYPTED CONTENT | Encrypted Data |
| CONTENT TYPE | Character String |
| CREATE TIME | Integer |

| ACKNOWLEDGMENT DATA STRUCTURE | |
|---|---|
| UIF MESSAGE ID | Character String |
| UIF DEVICE ID | Character String |
| USER RESPONSE | Character String |
| TIME | Integer |

PUSHING SECURE NOTIFICATIONS TO MOBILE COMPUTING DEVICES

CROSS-REFERENCE TO RELATED APPLICATIONS

This application is a Continuation of U.S. patent application Ser. No. 14/051,779, filed on Oct. 11, 2013, which is a Continuation of U.S. patent application Ser. No. 13/248,094, filed on Sep. 29, 2011, now U.S. Pat. No. 8,634,810, which are incorporated herein by reference.

TECHNICAL FIELD OF THE INVENTION

This disclosure relates generally to systems and methods for pushing secure notifications to mobile computing devices and, more specifically, a universal information framework (UIF) to implement push services for pushing secure notifications to mobile computing devices through native third-party push services and protocols.

BACKGROUND

Sending secure push notifications to mobile computing devices is a vital and important feature for many enterprise customers. For example, a credit card company may want to notify their customers of suspicious credit charges, a bank may want to notify its customers of deposits, withdrawals, and other changes to their accounts, or an IT manager may want to broadcast important information to corporate employees on important security updates etc. Currently, there are various mobile networks that offer different, proprietary push notification methods/protocols. For example, APPLE provides an infrastructure called Apple Push Notification Service (APNS) for developers to send push notifications to mobile applications. ANDROID offers a service called Cloud to Device Messaging (C2DM) for the same purposes. BLACKBERRY provides a similar service called BlackBerry Push Service. These systems are controlled by the third parties that offer them (Apple, Google, Blackberry, etc. . . . ) and their security cannot be guaranteed to enterprise customers. The challenge for application developers is to securely push notifications through disparate services to a myriad of end point devices utilized by enterprise customers.

SUMMARY OF THE INVENTION

Exemplary embodiments of the invention generally include systems and methods for pushing secure notifications to mobile computing devices and, more specifically, a universal information framework (UIF) to implement push services for pushing secure notifications to mobile computing devices through native third-party push services and protocols.

In one exemplary embodiment of the invention, a method is provided that is implemented by a push service platform for pushing secure notifications to a mobile computing device. The method includes the push service platform receiving a push notification message request from an entity registered with the push service platform, processing the push notification message request to generate a secure push notification message, and sending the secure push notification message to a target mobile computing device through a native third-party push service associated with the target mobile computing device. The secure push notification message includes a message ID (identifier) that corresponds to message content associated with the push notification message request. The method further includes the push service platform receiving a pull message request from the target mobile computing device, the pull message request requesting the message content associated with the push notification message corresponding to the message ID, and sending the requested message content associated with the push notification message to the mobile computing device.

In another exemplary embodiment of the invention, is method is provided that is implemented by a mobile computing device for processing push notification messages. The method includes receiving a push notification message from a native third-party push service associated with the mobile computing device, wherein the push notification message includes a message ID (identifier) which corresponds to message content that is associated with the push notification message and securely stored in a data store of a push service platform which is independent from the native third-party push service, sending a pull message request from the mobile computing device to the push service platform, the pull message request requesting the securely stored message content of the push notification message corresponding to the message ID, and receiving the message content associated with the push notification message from the push service platform.

These and other exemplary embodiments, features, objects and advantages of the present invention will become apparent from the following detailed description of illustrative embodiments thereof, which is to be read in connection with the accompanying drawings.

BRIEF DESCRIPTION OF THE DRAWINGS

FIG. 5 illustrates a device registration data structure according to an exemplary embodiment of the invention.

FIG. 6 illustrates a push notification device data structure according to an exemplary embodiment of the invention.

FIG. 7 illustrates a message registration data structure according to an exemplary embodiment of the invention.

FIG. 8 illustrates a push notification message data structure according to an exemplary embodiment of the invention.

FIG. 11 illustrates a secure message data structure according to an exemplary embodiment of the invention.

FIG. 12 illustrates an acknowledgment data structure according to an exemplary embodiment of the invention.

DETAILED DESCRIPTION OF EXEMPLARY EMBODIMENTS

Figure 1:
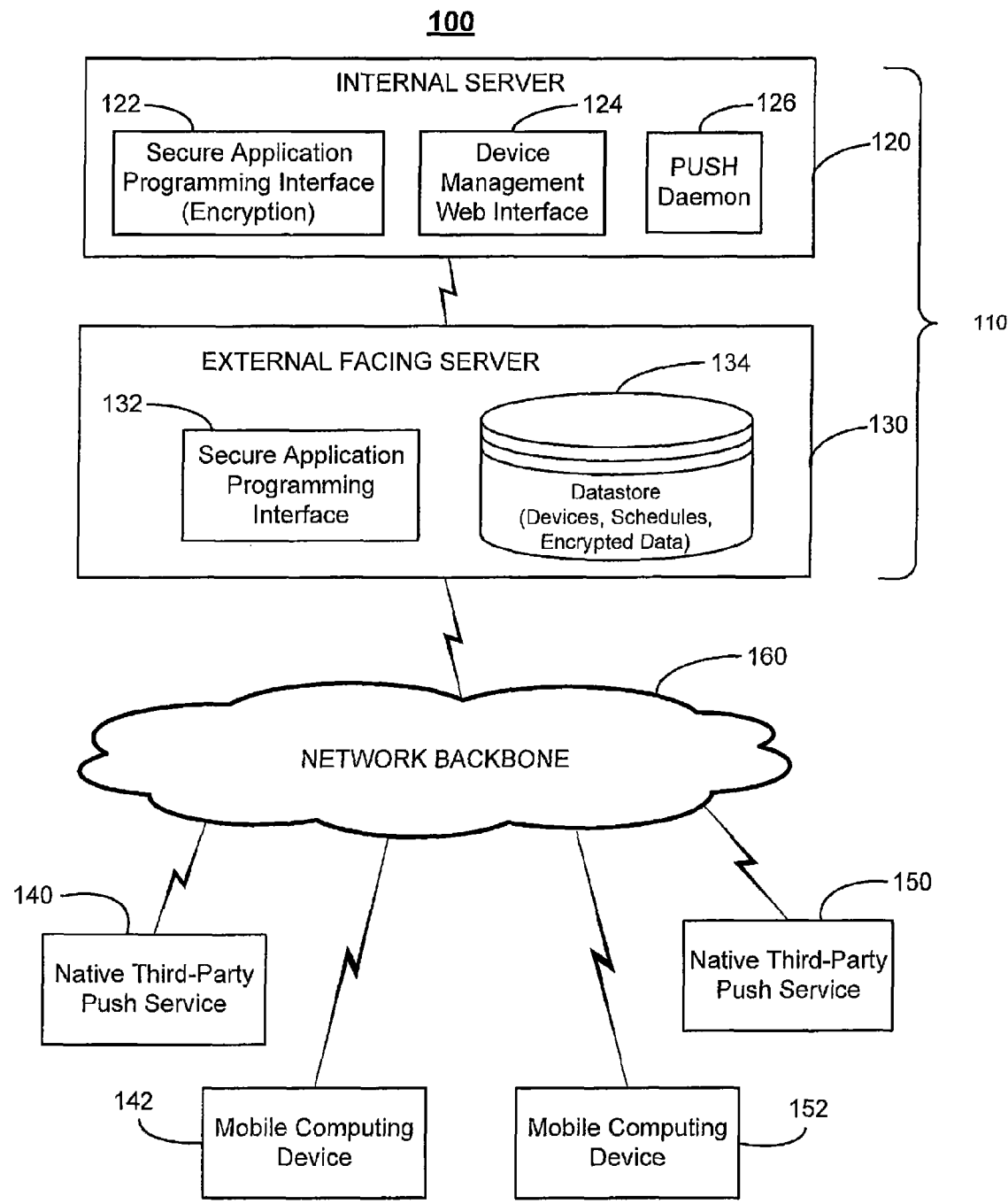
FIG. 1 is a block diagram of a system for pushing secure notifications to mobile computing devices using native third party push services, according to an exemplary embodiment of the invention.

Exemplary embodiments of the invention will now be described in further detail with regard to systems and methods for implementing secure push services using a universal information framework (UIF) to push secure notifications through native third-party push services and protocols. For example, FIG. 1 is a high-level block diagram of a system for pushing secure notifications to mobile computing devices using third party push services, according to an exemplary embodiment of the invention. In general, the system 100 includes a push services platform 110 having an internal server 120 and an external facing server 130, a plurality of third-party push service servers 140 and 150, and a plurality of mobile computing devices 142 and 152. The push services platform 110, third-party push service servers 140 and 150, and mobile computing devices 142 and 152 are all interconnected over a backbone of communications networks 160.

The third party push service servers 140 and 150 represent commercially available push notification services such as Apple Push Notification Service (APNS) provided by APPLE or Cloud to Device Messaging (C2DM) provided by GOOGLE or the BlackBerry Push Service provided by RIM Blackberry. The mobile computing devices 142, 152 represent various types of mobile computing devices that implement operating systems associated with the native third party push service providers, such as, for example, Apple iPhones, iPADS, Blackberry mobile phones, ANDROID mobile phones, etc. The network 160 generally denotes various types of networks including the Internet, wireless networks, and other types of networks, gateways, and supporting infrastructure to enable network communications between the various system entities.

The push services platform 110 implements a universal information framework (UIF) providing an agnostic, service-independent push notification service protocol (referred to herein as "UIF push notification service" or "UIF push service") for pushing secure notifications to the mobile computing devices 142 and 152 through the native third-party push services 140 and 150. In general, the internal server 120 comprises a secure application programming interface (API) 122, a device management web interface 124, and a PUSH Daemon 126. The external facing server 130 comprises a secure application programming interface (API) 132, and a secure data store 134. The secure internal server 120 and external facing server 130 collectively serve as a gateway that supports various functions such as, e.g., registering mobile computing devices with the UIF push service for receiving push notification services, registering new entities/users with the UIF push notification service, accepting new push notification requests from registered entities/users, generating push notification messages with specific levels of encryption and security and sending the push notification messages to the mobile computing devices 142 and 152 through the native third-party push services 140 and 150.

In particular, in the internal server 120, the secure API 122 provides an interface which allows new entities to register with the push service platform 110 and which allows registered entities to submit new push notification requests to be sent to users of registered mobile computing devices. The device management web interface 124 provides a secure API that allows mobile computing devices 142, 152 to register with the UIF push service platform 110 for receiving push notification messages from registered entities. The PUSH Daemon 126 implements methods for pushing secure notifications to registered mobile computing devices 142, 152 through a corresponding native third party push service 140, 150. The internal server 120 may be a secure server that is located behind a secure firewall of an entity providing the UIF push notification service, so that the internal server 120 is only accessible by authorized individuals such as administrators of the UIF push notification service.

In the external facing server 130, the secure API 132 provides an interface which allows mobile device users and client applications to register, interact and otherwise communicate with the UIF push service platform 110. The data store 134 stores various types of data to support the push notification services, including, but not limited information regarding registered mobile computing devices, scheduling information for pushing notification messages, and encrypted notification content data. The external facing server 130 is a secure server, but is made accessible by client applications and mobile device users to provide a web-based interface to the push service platform 110.

The secure APIs 122 and 132 of the push service platform 110 may be implemented using any suitable web-based secure communications interface. For instance, in one exemplary embodiment of the invention, the secure APIs 122 and 132 may be implemented using an HTTPS REST interface. As is known in the art, HTTPS or HyperText Transfer Protocol over SSL (Secure Socket Layer) is a TCP/IP protocol used by Web servers to transfer and display content securely. Moreover, REST, which stands for Representational State Transfer, is a stateless, client-server, cacheable communications protocol, in which the HTTP protocol is commonly used to make calls between computing devices and machines. The REST protocol uses HTTP requests to post data (create and/or update), read data (e.g., make queries), and delete data, that is, REST uses HTTP for all four CRUD (Create/Read/Update/Delete) operations.

Figure 2:
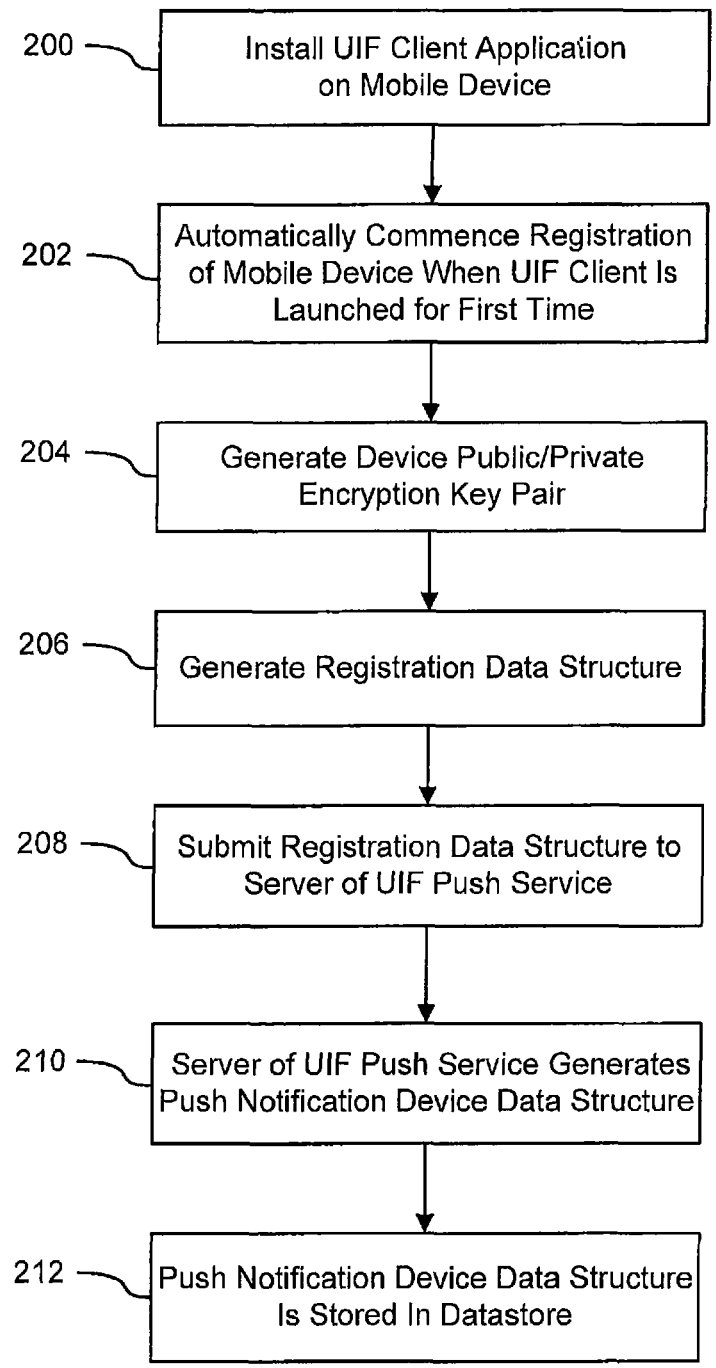
FIG. 2 is a flow diagram of a method for registering a mobile computing device with a system to receive secure push notifications using native third party push services, according to an exemplary embodiment of the invention.
Figure 3:
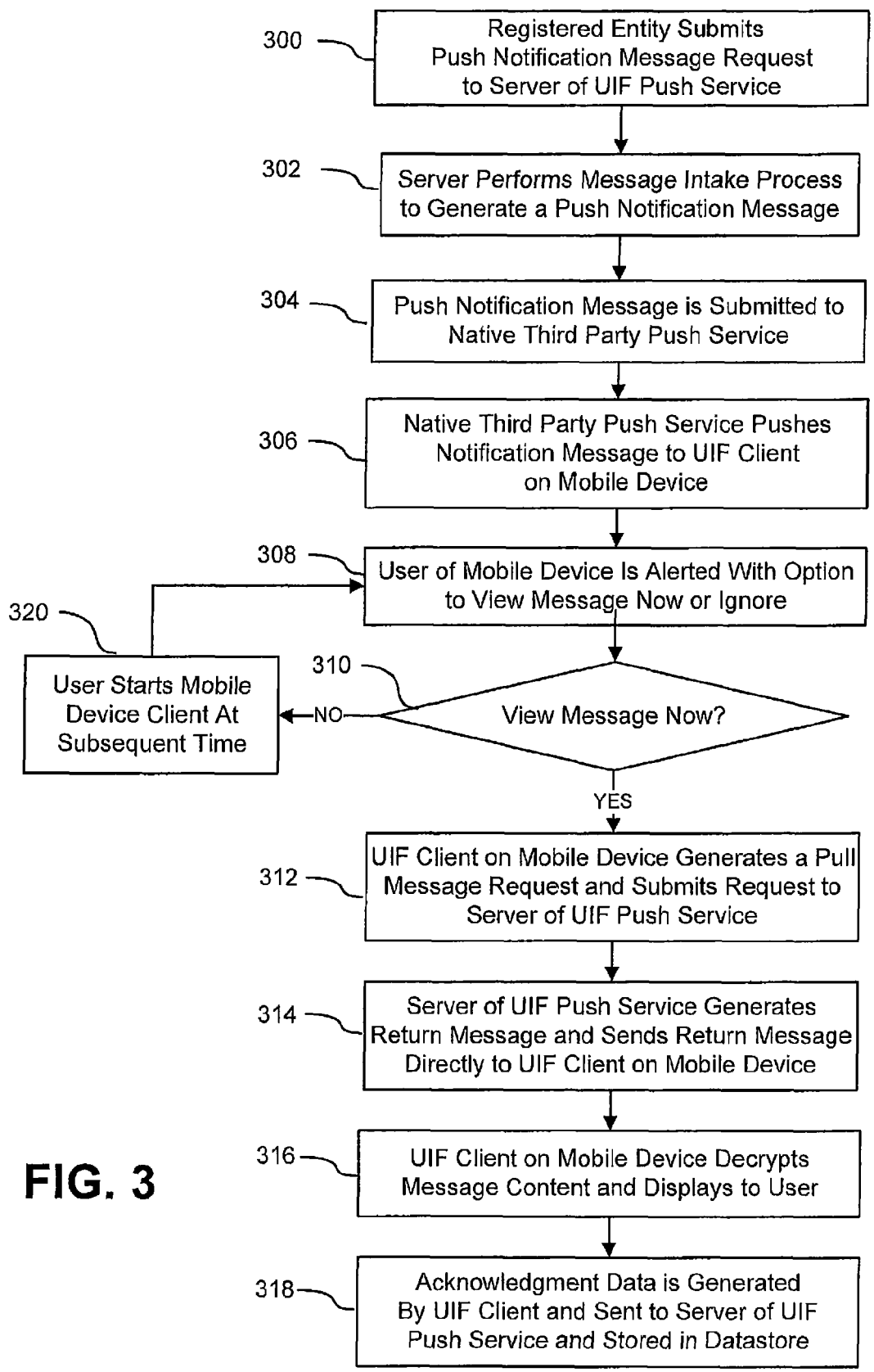
FIG. 3 is a flow diagram of a method for pushing secure notifications to a mobile computing device using native third party push services, according to an exemplary embodiment of the invention.
Figure 4:
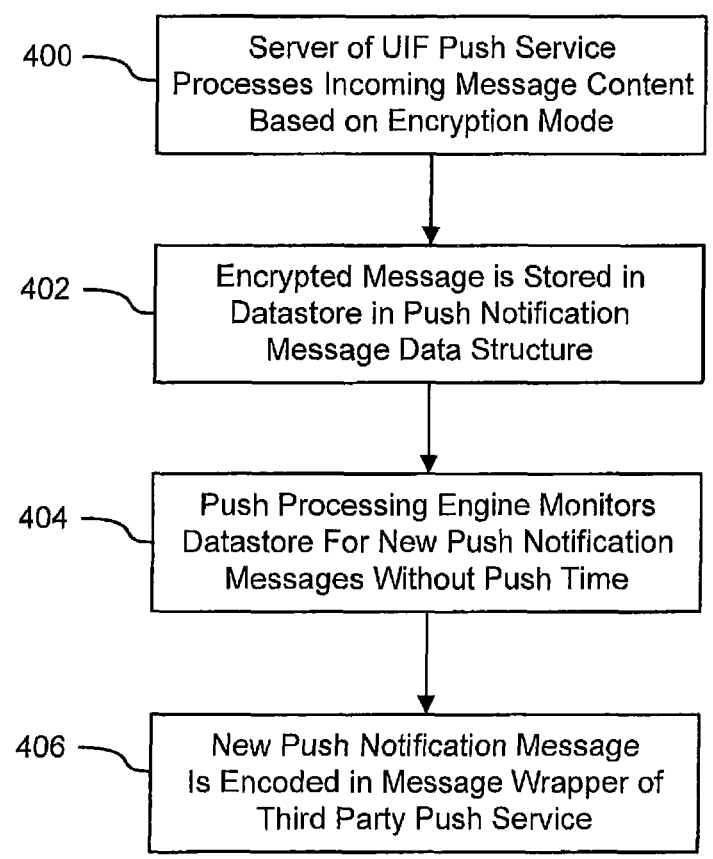
FIG. 4 is a flow diagram of a method for processing and encoding a notification message to be pushed to a mobile computing device using native third party push services, according to an exemplary embodiment of the invention.

Exemplary operating modes of the UIF push services platform 110 will now be discussed in further detail with reference to methods depicted in FIGS. 2, 3 and 4. As discussed in further detail below, FIG. 2 illustrates a method for registering a mobile computing device with the UIF push notification services platform 110 to receive secure push notifications using native third party push services, FIG. 3 illustrates a method for pushing secure notifications to a mobile computing device using native third party push services, and FIG. 4 illustrates a method for processing and encoding a notification message to be pushed to a mobile computing device using native third party push services. Moreover, FIGS. 5, 6, 7, 8, 9, 10, 11, and 12 illustrate various data structures for generating push notification messages and otherwise exchanging data and messages between the UIF push services platform 110 and the mobile computing devices 142, 152. In one exemplary embodiment of the invention, the data structures are implemented using the known JSON (JavaScript Object Notation) standard, which provides a lightweight text-based open standard designed for representing data structures for human-readable data interchange. The JSON format is used for serializing and transmitting structured data over a network connection between a server and client application. It is to be understood that other suitable secure API and communication protocols may be implemented.

Referring now to FIG. 2, a flow diagram illustrates a method for registering a mobile computing device with a push services platform according to an exemplary embodiment of the invention. For purposes of illustration, the method of FIG. 2 will be discussed with reference to the exemplary system of FIG. 1. Initially, to register with and utilize the UIF push notification service for receiving secure notifications on a mobile computing device, a UIF client application is installed on the mobile computing device (step 200). The UIF client may be a pre-installed application on the mobile computing device that exists at time of purchase by a consumer, or it may be downloaded and stored at some later time after the user purchases the mobile computing device. When the UIF client is launched for the first time, a registration process is automatically commenced to register the mobile computing device with the UIF push service platform 110 (step 202). The UIF client will generate a public/private encryption key pair for the mobile computing device (step 204). The UIF client will generate registration data (step 206) and then submit the registration data to the push service server (step 208). In one exemplary embodiment of the invention, FIG. 5 illustrates a device registration data structure 500 that is used to submit registration data to the UIF push services platform 110.

As shown in FIG. 5, the device registration data structure 500 includes data fields such as (i) USER NAME, (ii) DEVICE TYPE, (iii) DEVICE INFORMATION, (iv) USER PASSWORD, and (v) PUBLIC ENCRYPTION KEY. The USER NAME data field is a character string data type which specifies the user name of the person who owns/uses the mobile computing device to be registered. The DEVICE TYPE data field is a character data type that specifies what type of mobile computing device is being registered. The DEVICE INFORMATION data field is a character string data type that provides other useful information regarding the mobile computing device being registered, such as device ID, manufacturer, operating system version, and other device information that is commonly exposed through public APIs. The USER PASSWORD data field is a character string data type which specifies a password of the user. The user password is a user-specific password that allows the UIF push service platform 110 to authenticate the user and determine if the user is an authorized user/owner of the mobile computing device. The PUBLIC ENCRYPTION KEY data field is a character data type that specifies the public encryption key that was generated by the UIF client for the mobile computing device. The public encryption key is specific to the mobile computing device being registered.

Referring back to FIG. 2, the UIF push service platform 110 uses the device registration data to register the mobile computing device and generate push notification device data corresponding to the registered mobile computing device (step 210). In one exemplary embodiment, in the system of FIG. 1, the UIF client application submits the registration data to the secure API 132 of the external facing server 130, and the registration data is passed to the device management web interface 124 in the back end internal server 120. The device management interface 124 implements methods to generate the push notification device data for registering the mobile computing device to receive push notification services. The push notification device data is then stored in the secure data store 134 of the external facing server 130 (step 212). In one exemplary embodiment of the invention, the push notification device data is stored in a data structure 600 such as depicted in FIG. 6.

As shown in FIG. 6, the push notification device data structure 600 includes data fields such as (i) USER NAME, (ii) UIF DEVICE ID, (iii) DEVICE TYPE, (iv) DEVICE ACTIVE, (v) REGISTRATION TIME, (vi) LAST UPDATE TIME, (vii) DEVICE INFORMATION, and (viii) PUBLIC ENCRYPTION KEY. The USER NAME, DEVICE TYPE, DEVICE INFORMATION, and PUBLIC ENCRYPTION KEY include the same device registration data information submitted in the corresponding data fields of the device registration data structure 500 discussed above. The UIF DEVICE ID is a character string data type which specifies a unique, random identifier (ID) that is assigned to the mobile computing device being registered by the UIF push service platform 110. The DEVICE ACTIVE data field is a Boolean data type which indicates whether the registered device is actively used (e.g., whether registered device has been actively used or not within a certain period of time such as one month). The REGISTRATION TIME data field is an integer data type that specifies the date and time when the associated mobile computing device was registered with the UIF push service platform 110. The LAST UPDATE TIME data field is an integer data type that specifies the last time that the UIF client application on the mobile computing device was used, invoked or otherwise updated. The registration information for a given mobile computing device which is stored in the data store 134 of the UIF external facing server 130 (in the form of the push notification device data structure 600) is periodically accessed and updated in response to certain events, such as when a secure notification is to be pushed to the registered mobile computing device.

FIG. 3 is a flow diagram of a method for pushing secure notifications to a mobile computing device using native third party push services, according to an exemplary embodiment of the invention. For purposes of illustration, the method of FIG. 3 will be discussed with reference to the exemplary system of FIG. 1. When a registered entity (such as a bank, credit card company, etc.) wants to send a push notification message to one of its customers who has a mobile computing device registered with the UIF push service platform 110, the registered entity will submit a push notification message request to the UIF push service platform 110 (step 300). For example, the registered entity will submit a push notification message request to the UIF push service platform 110 via the secure API 122. In one exemplary embodiment of the invention, the push notification message request includes message information that is submitted in the form of a message registration data structure 700, such as shown in FIG. 7.

More specifically, as shown in FIG. 7, an exemplary message registration data structure 700 includes data fields such as (i) TARGET UIF DEVICE ID, (ii) TITLE, (iii) CONTENT, (iv) CONTENT TYPE, (v) ENCRYPTION MODE, and (vi) PRIORITY. The UIF DEVICE ID specifies the unique, random device ID that was assigned to the mobile computing device during registration by the UIF push service platform 110 (and included in the corresponding push notification device data structure 600, as discussed above). The TITLE data field is a character string data type that specifies a message title provided by the registered entity. The CONTENT data field is a binary data type that contains the unencrypted digital content of the message that the registered entity wants to send to its customer. The CONTENT TYPE data field is a character string data type that specifies the type of content (e.g., MIME type, or Internet Media type) of the push notification message. The ENCRYPTION MODE data field is a character string data type that specifies the type and/or level of encryption that is to be applied to the push notification message content (as will be explained in further detail below).

The PRIORITY data field is an integer data type that specifies a numeric priority level which indicates certain server-side and/or client-side priorities that are to be accorded to the corresponding push notification message. For example, with regard to server-side priorities, a priority level may specify a priority in the order in which notification messages are to be pushed with respect to other pending notification messages to be pushed by the UIF push service platform 110. Indeed, a higher priority push notification message may be pushed before another lower priority push notification message even when, for instance, the lower priority push notification message was received by the UIF push service platform 110 before the higher priority push notification message. With regard to client-side priorities, as explained in further detail below, a priority level may specify how user is to be alerted (e.g., with or without a certain audible sound) when the push notification message is received by the UIF client on the mobile computing device, or what actions the user may or may not take in response to the push notification message (e.g., whether or not the user must review the message or be allowed to dismiss the message without reading the message, or how the message is to be displayed to the user, whether the message could be persistently stored on the computing device, etc.).

Referring back to FIG. 3, after receiving the message registration data, the UIF push service platform 110 will perform a message intake process to generate a push notification message (step 302). An exemplary message intake process is illustrated in FIG. 4. The secure API 122 of the internal server 120 of the UIF push service platform 110 will process the incoming message content based on the encryption mode and security level specified in the message registration data structure (step 400). For example, for an encryption mode that specifies a "low" level of security, the message content can submitted to the UIF push services platform 110 and stored in the data store 134 as clear (unencrypted) text. For an encryption mode that specifies a "medium" level of security, the content can be submitted to the UIF push service platform 110 and processed initially through the system as clear (unencrypted) text, but then encoded using any suitable encryption protocol, such as symmetrical encryption or public key encryption, just before being stored in the secure data store 134. Moreover, for an encryption mode that specifies a "high" level of security, the message content can be submitted to the UIF push service platform 110 and immediately encoded using any suitable encryption protocol, such as symmetrical encryption or public key encryption, and then remain encoded throughout the intake process and stored in encrypted form in the data store 134.

The incoming message content and other information is then combined to form a push notification message, which is stored in the data store 134 in a push notification message data structure (step 402). For example, FIG. 8 illustrates a push notification message data structure 800 according to an exemplary embodiment of the invention. For example, the push notification message data structure 800 shown in FIG. 8 includes data fields such as (i) UIF MESSAGE ID, (ii) UIF DEVICE ID, (iii) TITLE, (iv) ENCRYPTED CONTENT, (v) CREATION TIME, (vi) PUSH TIME, (vii) CONTENT TYPE, and (viii) PRIORITY. The UIF DEVICE ID, TITLE, CONTENT TYPE, and PRIORITY data fields include the same data that was provided in the corresponding data fields of the message registration data structure 700, as discussed above. The UIF MESSAGE ID data field is a character string data type which specifies a unique message identifier (ID) that is assigned to the push notification message by the UIF push service platform 110. In a preferred embodiment, the UIF MESSAGE ID further includes information that specifies a sequence or order in which the given push notification message was received by the UIF push service platform 100 from a registered entity, with respect to other push notification messages previously received by the UIF push service platform 100. The ENCRYPTED CONTENT data field contains the encrypted message content. The CREATION TIME data field is an integer data type that specifies the time that the push notification message data structure was created. The PUSH TIME data field is an integer data type that specifies a time at which the notification message is scheduled to be pushed and/or the time when the notification message was in fact pushed.

Referring back to FIG. 4, as push notification messages are processed and stored in the data store 134 in the form of push notification message data structures as discussed above, a push processing engine (e.g., the PUSH Daemon 126, FIG. 1) will monitor the data store 134 for new push notification message data structures that have no assigned PUSH TIME (step 404). For a new push notification message data structure without an assigned PUSH TIME, the PUSH TIME data field will be populated with an assigned push time according to a priority of the push notification message. When it is time for a new notification message to be pushed, the corresponding push notification message data structure is encoded (wrapped) as a wake-up message data structure in a third party push service message wrapper (step 406). The wake-up message data structure is essentially a push notification message containing a message identifier and metadata generated by the UIF push service platform 110 and submitted to a corresponding native third party push service that is associated with the OS manufacture of the target mobile computing device.

Figure 9:
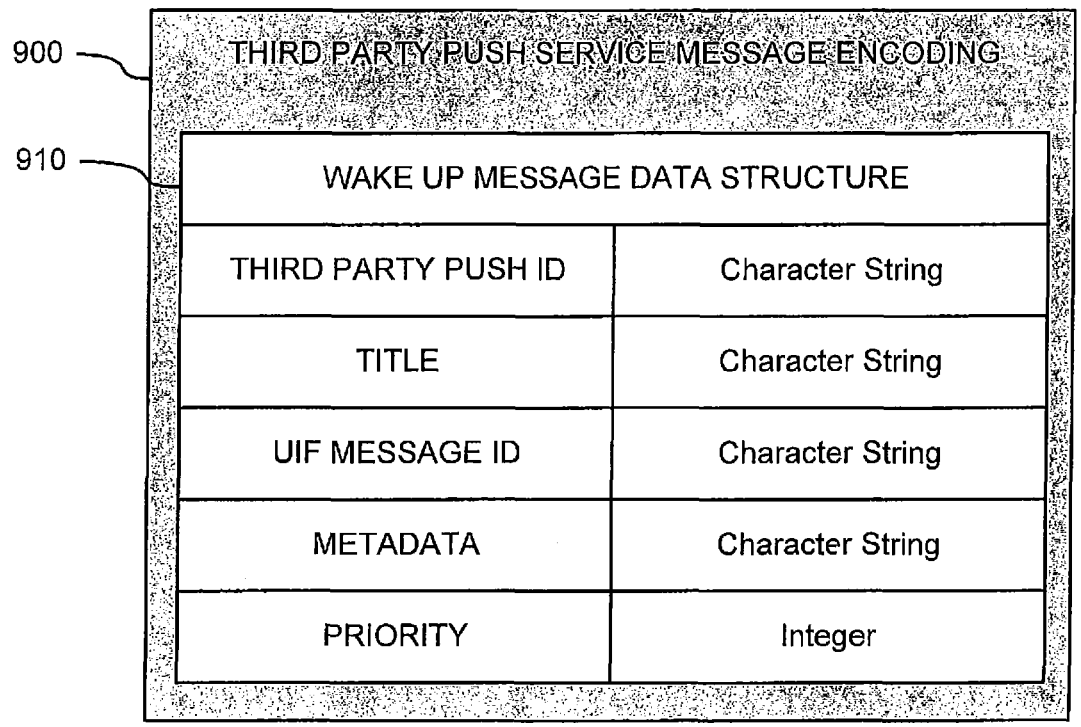
FIG. 9 illustrates a third party push notification message encoded with a wake-up message data structure according to an exemplary embodiment of the invention.

For example, FIG. 9 illustrates a third party push notification message encoded with a wake-up message data structure according to an exemplary embodiment of the invention. As shown in FIG. 9, a push notification wake-up message data structure 910 payload is wrapped/encoded in a third party push service encoded message 900. The third party push service message encoding 900 represents a portion of the push notification message that includes standard variables, parameters and encoding formats that are required by a given native third party push service for sending push notification messages to mobile computing devices. The push notification wake-up message data structure 910 contains UIF message payload information, which includes data fields such as (i) THIRD PARTY PUSH ID, (ii) TITLE, (iii) UIF MESSAGE ID, (iv) METADATA, and (v) PRIORITY. The TITLE, UIF MESSAGE ID and PRIORITY data fields include the same data that was provided in the corresponding data fields of the push notification message data structure 800 (and other data structures), as discussed above. The THIRD PARTY PUSH ID data field is a character string data type that is assigned by the UIF push service platform 110, which specifies a unique identifier that identifies the target mobile computing device and specific UIF client (operating on the target mobile computing device) that is to receive and process the push notification message. The METADATA data field is a character string data type which specifies certain miscellaneous information associated with the push notification message, such as encryption information with regard to encrypted message content, and information that is used by the UIF client to carry out client-side PRIORITY actions, e.g., a specific audible tone to generate to alert the user when the push notification message is received, etc.

Returning to FIG. 3, the push notification message containing the message identifier and metadata (having a data structure such as shown in FIG. 9) is submitted to the corresponding native third party push service (step 304). The native third party push service will then push the notification message to the UIF client of the target mobile computing device (step 306). The UIF client will generate an alert to notify the user of the option to view the message now or to ignore the message (step 308). If the user chooses to ignore the message (negative result in step 310), the user may launch the UIF client at a later time (step 320) and will be alerted that there is a pending message that the user can view or ignore (step 308). When the user chooses to view the message (affirmative result in step 310), the UIF client will generate a pull message request and submit the pull message request to the server of the UIF push service platform 110 (step 312). For example, to create a pull message request, device information is collected and a JSON string is generated containing the device information. A request for the push notification message content is added to the JSON string. The pull message request data is then POSTed to the server of the UIF push service platform 110 via HTTPs.

Figure 10:
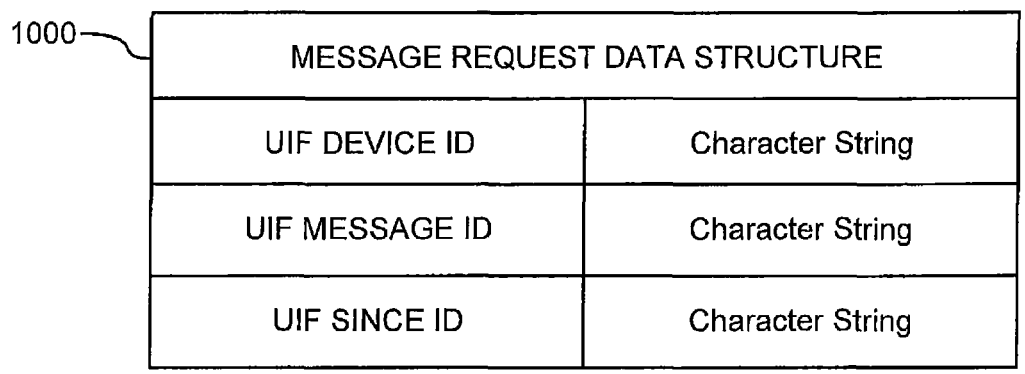
FIG. 10 illustrates a message request data structure according to an exemplary embodiment of the invention.

In one exemplary embodiment of the invention, a pull message request includes a message request data structure 1000 as depicted in FIG. 10. More specifically, as shown in FIG. 10, the message request data structure 1000 includes data fields such as (i) UIF DEVICE ID, (ii) UIF MESSAGE ID, and (iii) UIF SINCE ID. The UIF DEVICE ID and UIF MESSAGE ID data fields include the same UIF message and device ID information as discussed above, wherein the UIF DEVICE ID specifies the unique, random device ID assigned by the UIF service platform 110 to the mobile computing device, and the UIF MESSAGE ID includes the unique message ID that corresponds to the message content of the corresponding push notification message, which is to be retrieved from the data store 134 of the UIF push service platform 110. The UIF message ID can be specified and that specific message will be returned. The UIF SINCE ID data field is a character string data type that specifies a UIF message ID, but this data field can be used so that not only will the specific message be returned as indicated by the UIF message ID, but also any other messages that were sent since (after) that message.

Returning to FIG. 3, after the pull message request data is POSTed to the server, the UIF push service platform 110 will generate a return message and send the return message directly to UIF client of the target mobile computing device (step 314). In this step, based on the UIF message ID information, the encrypted message content that is associated with the push notification message previously received by the UIF push service platform 110 is retrieved from the data store 134, and then sent to the UIF client of the target mobile computing device from the server of the UIF push service platform 110. In one exemplary embodiment of the invention, the message content is sent from the UIF push services platform 110 to the UIF client on the mobile computing device using a secure message data structure as depicted in FIG. 11.

More specifically, as shown in FIG. 11, a secure message data structure 1100 includes data fields such as (i) TITLE, (ii) ENCRYPTED CONTENT, (iii) CONTENT TYPE, and (iv) CREATE TIME. The TITLE data field is a character string data type which specifies the title of the original push notification message received by the UIF push service platform 110. The ENCRYPTED CONTENT data field contains the encrypted message data content. The CONTENT TYPE data field is a character string data type which specifies the type of message content (e.g., Internet Media Type, MIME type). The CREATE TIME data field is an integer data type that specifies a time that the secure message data was created.

When the target mobile computing device receives the return message (secure push notification message) from the UIF push service platform 110, the UIF client on the mobile computing device will decrypt the message content and display the decrypted content to the user (step 316). Depending on the security level of the message, the message may be displayed as a water stamped image and automatically deleted after viewing. The message may be displayed in the form of its content type and automatically deleted after viewing. The message may be displayed as its content type and remain on mobile computing device until manually deleted by the user. The manner in which the message content is displayed, rendered, persistently stored, etc., by the UIF client on the target mobile computing device is based on the information specified in the PRIORITY and METADATA data fields of the wake-up message data structure 910, as discussed above with regard to FIG. 9.

After receiving the secure push notification message, the UIF client will generate an acknowledgment message and send the acknowledgment message to the UIF push service platform 110 where it is stored in the data store 134 (step 318). The acknowledgement message may be POSTed to a server of the UIF push service platform 110 using HTTP. In one exemplary embodiment of the invention, an acknowledgment message comprises an acknowledgment data structure 1200, such as depicted in FIG. 12. More specifically, as shown in FIG. 12, an acknowledgment data structure 1200 includes data fields such as (i) UIF MESSAGE ID, (ii) UIF DEVICE ID, (iii) USER RESPONSE, and (iv) TIME. The UIF MESSAGE ID and UIF DEVICE ID include the same unique message and device IDs as discussed above with regard to other data structures. The USER RESPONSE data field is a character string data type that specifies the user's response to the notification message. The TIME data field is an integer data type that specifies the time of the acknowledgment message.

In accordance with exemplary embodiments of the invention, the USER RESPONSE may indicate one of various types of user responses such as, e.g., the push notification message was received by the UIF client but not yet read or displayed by the user, or that the push notification message was received and actually read by or otherwise displayed to the user, or that push notification message was received and dismissed/deleted by the user without being read, or other types of user responses. It is to be understood that one or more acknowledgement data messages may be sent at different times in response to a given push notification message received by the target mobile computing device. For instance, a first acknowledgment message may be automatically sent from the UIF client to the UIF push service platform 110 to indicate that the push notification message was successfully received, and a second acknowledgement message may be subsequently sent from the UIF client to the UIF push service platform 110 when the user takes some specific action (read, display, delete, etc.) with regard to the push notification message.

As will be appreciated by one skilled in the art, aspects of the present invention may be embodied as a system, apparatus, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1-12, the diagrams in the figures illustrate the architecture, functionality, and operation of possible implementations of systems, methods, and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Figure 13:
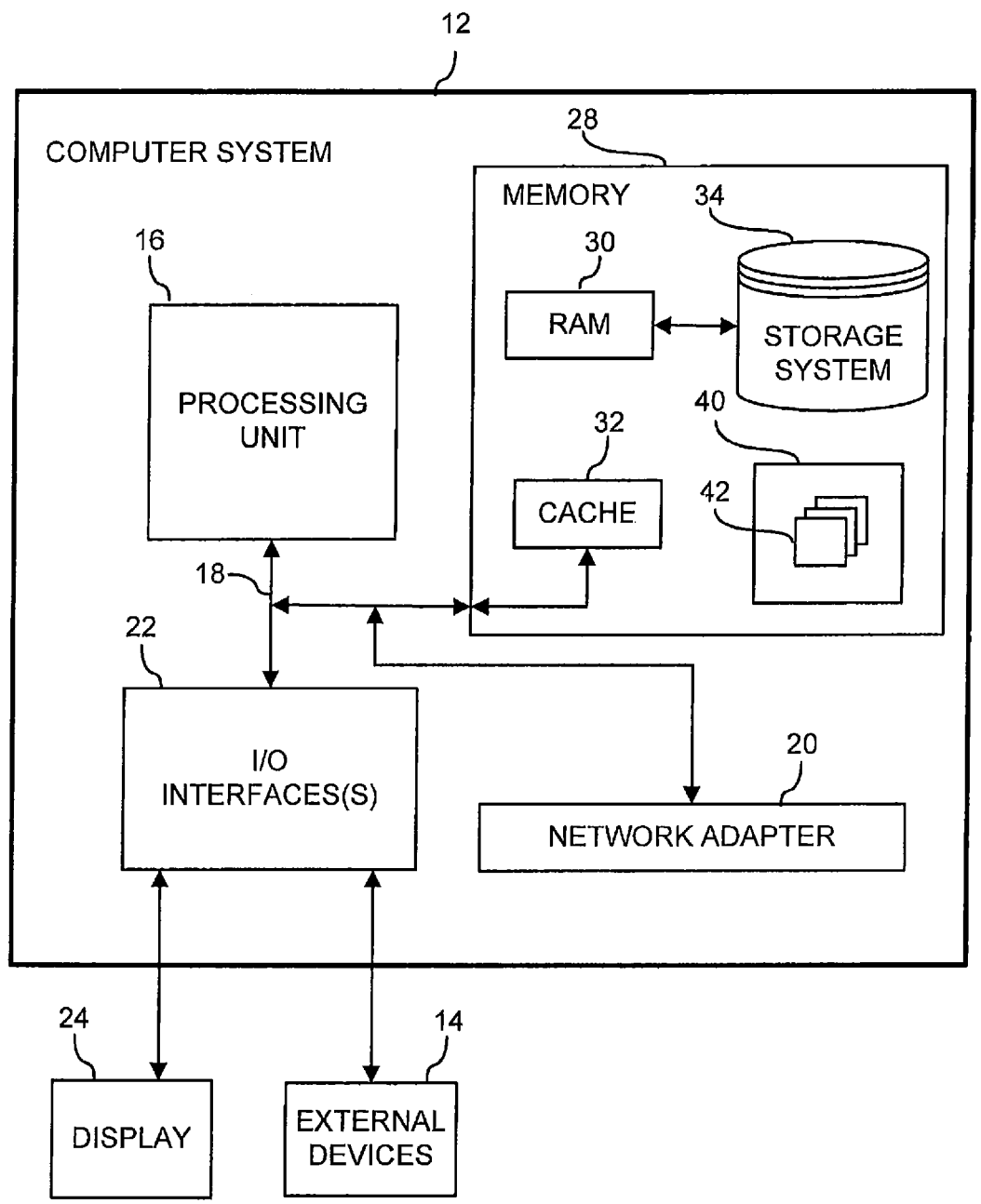
FIG. 13 illustrates a computer system that may be used to implement one or more components/steps of the techniques of the invention, according to an exemplary embodiment of the invention.

One or more embodiments can make use of software running on a general-purpose computer or workstation. With reference to FIG. 13, in a computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

The Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 12 typically includes a variety of computer system readable media. Such media may be any available media that is accessible by computer system/server 12, and it includes both volatile and non-volatile media, removable and non-removable media.

The system memory 28 can include computer system readable media in the form of volatile memory, such as random access memory (RAM) 30 and/or cache memory 32. The computer system/server 12 may further include other removable/non-removable, volatile/nonvolatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As depicted and described herein, memory 28 may include at least one program product having a set (e.g., at least one) of program modules that are configured to carry out the functions of embodiments of the invention.

The program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc., one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented by a mobile computing device for processing push notification messages, comprising:
   receiving, by the mobile computing device, a secure push notification message from a native third-party push service associated with the mobile computing device, wherein the secure push notification message includes a message ID (identifier) which corresponds to message content that is associated with the secure push notification message, but wherein the message content is not included in the secure push notification message, and wherein the message content is securely stored in a data store of a push service platform which generated the secure push notification message, wherein the push service platform is independent from the native third-party push service;
   sending, by the mobile computing device, a pull message request from the mobile computing device to the push service platform, the pull message request requesting the securely stored message content corresponding to the message ID; and
   receiving, by the mobile computing device, the message content from the push service platform in response to the pull message.

2. The method of claim 1, wherein the message content received from the push service platform comprises encrypted message content, and wherein the method further comprises the mobile computing device decrypting the encrypted message content.

3. The method of claim 1, wherein the secure push notification message received from the native third-party push service comprises priority information provided by a registered entity of the push service platform, wherein the priority information provided by the registered entity specifies one or more client-side priorities that are to be accorded to the secure push notification message, wherein a client-side priority specifies how a user is to be alerted when the secure push notification message is received by the mobile computing device.

4. The method of claim 3, wherein a client-side priority specifies actions that a user may take with regard to accessing, dismissing or storing the message content received from the push service platform by the mobile computing device.

5. The method of claim 1, further comprising sending an acknowledgment message from the mobile computing device to the push service platform, wherein the acknowledgement message includes user response information that indicates an action taken by the user with respect to the secure push notification message received by the mobile computing device.

6. An article of manufacture comprising a non-transitory computer readable storage medium comprising program code embodied thereon, which when executed by a mobile computing device, performs method steps for processing push notification messages, comprising:

receiving, by the mobile computing device, a secure push notification message from a native third-party push service associated with the mobile computing device, wherein the secure push notification message includes a message ID (identifier) which corresponds to message content that is associated with the secure push notification message, but wherein the message content is not included in the secure push notification message, and wherein the message content is securely stored in a data store of a push service platform which generated the secure push notification message, wherein the push service platform is independent from the native third-party push service;

sending, by the mobile computing device, a pull message request from the mobile computing device to the push service platform, the pull message request requesting the securely stored message content corresponding to the message ID; and receiving, by the mobile computing device, the message content from the push service platform in response to the pull message.

7. The article of manufacture of claim 6, wherein the message content received from the push service platform comprises encrypted message content, and wherein the method steps further comprise the mobile computing device decrypting the encrypted message content.

8. The article of manufacture of claim 6, wherein the secure push notification message received from the native third-party push service comprises priority information provided by a registered entity of the push service platform, wherein the priority information provided by the registered entity specifies one or more client-side priorities that are to be accorded to the secure push notification message, wherein a client-side priority specifies how a user is to be alerted when the secure push notification message is received by the mobile computing device.

9. The article of manufacture of claim 8, wherein a client-side priority specifies actions that a user may take with regard to accessing, dismissing or storing the message content received from the push service platform by the mobile computing device.

10. The article of manufacture of claim 6, wherein the methods steps further comprise sending an acknowledgment message from the mobile computing device to the push service platform, wherein the acknowledgement message includes user response information that indicates an action taken by the user with respect to the secure push notification message received by the mobile computing device.

11. A mobile computing device, comprising:

a memory; and a processor coupled to the memory and configured to execute code stored in the memory to:

receive, by the mobile computing device, a secure push notification message from a native third-party push service associated with the mobile computing device, wherein the secure push notification message includes a message ID (identifier) which corresponds to message content that is associated with the secure push notification message, but wherein the message content is not included in the secure push notification message, and wherein the message content is securely stored in a data store of a push service platform which generated the secure push notification message, wherein the push service platform is independent from the native third-party push service;

send, by the mobile computing device, a pull message request from the mobile computing device to the push service platform, the pull message request requesting the securely stored message content corresponding to the message ID; and receive, by the mobile computing device, the message content from the push service platform in response to the pull message.

12. The mobile computing device of claim 11, wherein the message content received from the push service platform comprises encrypted message content, and wherein the mobile computing device decrypts the encrypted message content.

13. The mobile computing device of claim 11, wherein the secure push notification message received from the native third-party push service comprises priority information provided by a registered entity of the push service platform, wherein the priority information provided by the registered entity specifies one or more client-side priorities that are to be accorded to the secure push notification message, wherein a client-side priority specifies how user is to be alerted when the secure push notification message is received by the mobile computing device.

14. The mobile computing device of claim 13, wherein a client-side priority specifies actions that a user may take with regard to accessing, dismissing or storing the message content received from the push service platform by the mobile computing device.

15. The mobile computing device of claim 11, wherein the processor is further configured to execute code stored in the memory to send an acknowledgment message from the mobile computing device to the push service platform, wherein the acknowledgement message includes user response information that indicates an action taken by the user with respect to the secure push notification message received by the mobile computing device.

* * * * *